United States Patent [19]

Ahrens et al.

[11] 3,814,387
[45] June 4, 1974

[54] APPARATUS FOR DOSING AND MIXING LIQUID OR SOLID MATERIALS FOR DENTAL PURPOSES

[75] Inventors: Wilhelm Ahrens, Bergen-Enkheim; Hans Lea, Frankfurt; Fritz Röhm, Stuttgart-Kaltental; Heinz Straehle, Schwabisch Gmund, all of Germany

[73] Assignee: Deutsche Gold-und Silber-Scheideanstalt vormals Roessler, Frankfurth am Main, Germany

[22] Filed: Nov. 30, 1972

[21] Appl. No.: 310,967

[30] Foreign Application Priority Data
Dec. 1, 1971   Germany.............................. 2159454

[52] U.S. Cl............................. 259/72, 259/DIG. 20
[51] Int. Cl.............................................. B01f 11/00
[58] Field of Search .......... 259/DIG. 20, 72, 12, 13, 259/17, 29, 35, 54, 55, 56, 57, 59, 75, 91

[56] References Cited
UNITED STATES PATENTS

| | | | |
|---|---|---|---|
| 1,863,977 | 6/1932 | Forde | 259/48 |
| 3,271,011 | 9/1966 | Rohm | 259/12 |
| 3,347,530 | 10/1967 | Platt | 259/12 |
| 3,534,943 | 10/1970 | Ahrens | 259/12 |
| 3,583,647 | 6/1971 | Paterson | 259/54 |
| 3,749,371 | 7/1973 | Mader | 259/DIG. 20 |

Primary Examiner—Robert W. Jenkins
Attorney, Agent, or Firm—Cushman, Darby & Cushman

[57] ABSTRACT

A space saving apparatus is provided for dentists wherein both the measuring and mixing of metal filings for preparing the amalgam paste and the shaking of premeasured capsule containing components for the preparation of dental cements and dental synthetic resins are carried out in a single housing.

1 Claim, 2 Drawing Figures

PATENTED JUN 4 1974  3,814,387
Fig.1
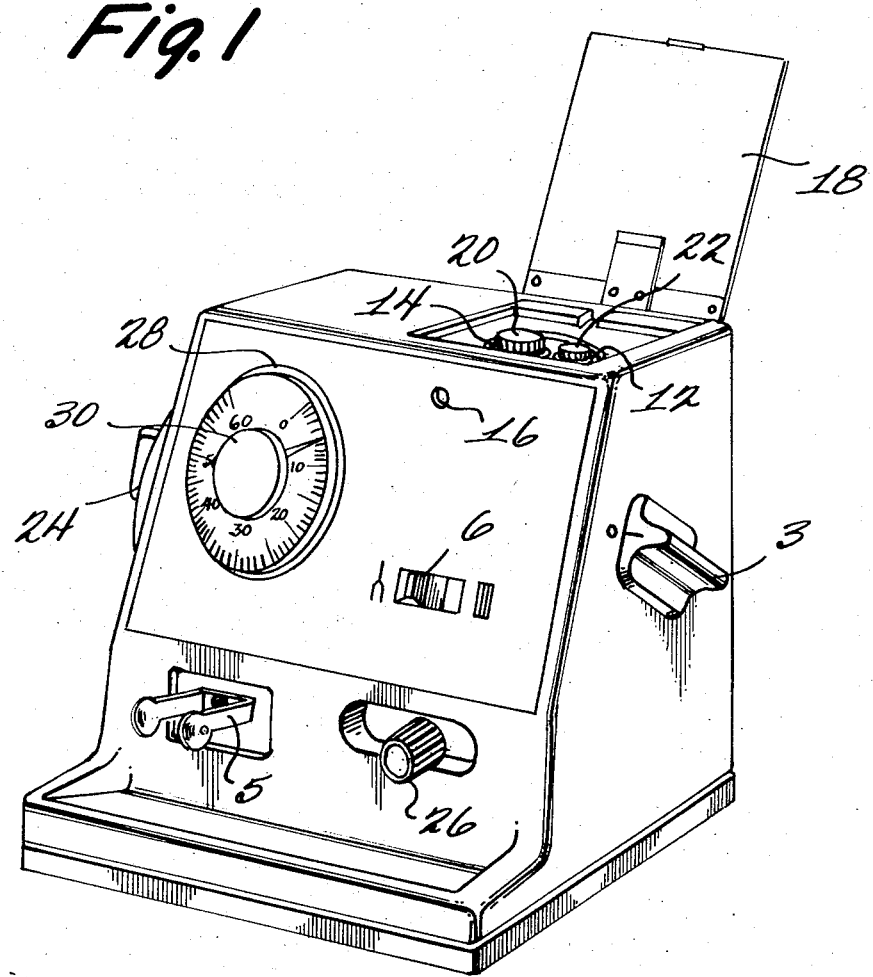
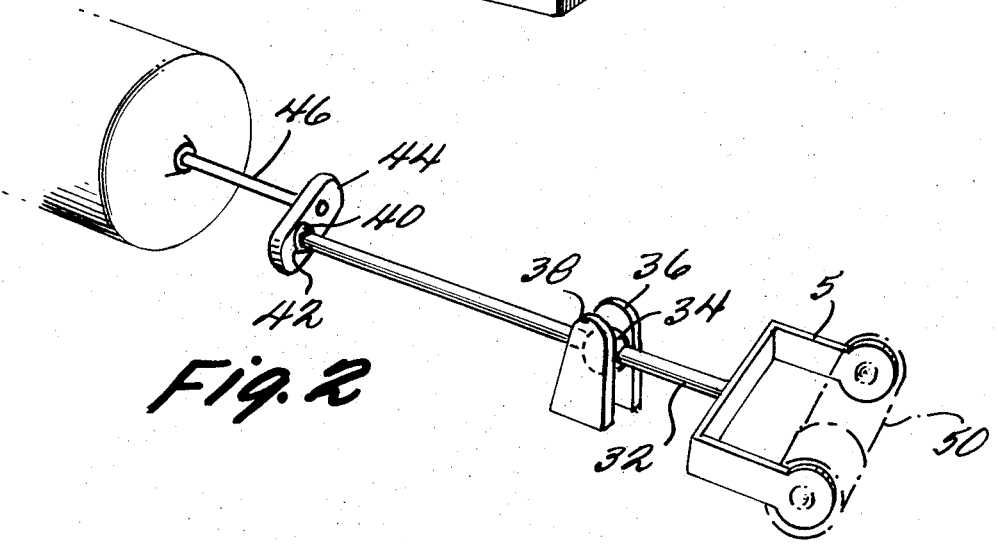
Fig.2 from the capsule. The mixing fork is not constructed to hold capsules of only one specific form or shape, but is capable of holding capsules of about the same size but of widely varying shape. The amplitude and the frequency of this mixing mechanism are so selected that faultless mixing of pre-measured filling materials, such as cements, amalgams and synthetic resins, is guaranteed. One may switch from one mixing mechanism to the other by means of the sliding switch 6.

The most important advantage of the apparatus, more specific of that part comprising the measuring mechanism, is that it permits measuring out of widely varying quantities and preparation of amalgams of any desired consistency. The device which regulates the measuring of the powder is therefore so constructed that its setting may easily be adjusted from the outside with the aid of a suitable instrument, such as a screwdriver or a coin.

For safety purposes as stated there is preferably provided a safety-switch which interrupts the current to the motor (not shown) of the mixer when the mixing vessel of the measuring and mixing device 2 has not been firmly secured to the housing.

What is claimed is:

1. Mixing apparatus for mixing liquid and solid materials to be used in denistry comprising in combination a housing, a first means for measuring and mixing mercury and metal filings in said housing, a second means for mixing premeasured filling materials in said housing, a sliding switch for alternatively controlling said first and second means, and a safety-switch adapted to interrupt current to the motor of the mixing apparatus whenever said first means is not firmly secured to said housing.

* * * * *

APPARATUS FOR DOSING AND MIXING LIQUID OR SOLID MATERIALS FOR DENTAL PURPOSES

In dental medicine plastic filling- and anchoring materials are used which, shortly before their application, are prepared by the dentist or his assistant, starting from two or more compoenents. To this end the liquid and powdery components have to be measured out and mixed in the correct proportions. The best known materials comprise filling-amalgams, filling- and adhesive cements and synthetic resin fillings.

These materials used to be measured out and mixed by hand. Later on, as is known, manually operated volume-measuring devices for measuring both components, viz. mercury and metal-filings, of filling-amalgams and electric-powdered mixing devices, so-called shakers, for the preparation of the amalgam-paste were introduced. A recent development is an apparatus which measures and mixes the mercury and the metal-filings in one operation, so that the dentist can take the finished amalgam-paste out of the apparatus.

Moreover, capsule-formed containers are known, especially capsules containing the components of dental cement or dental synthetic resin in amounts premeasured by the producer. Shortly before their application, the liquid and powder components contained in these capsules are combined by mechanical means and mixed, while still in the capsule which thus doubles as a mixing-vessel, with the aid of an electric-powdered shaker in which the capsules are mounted.

From what has been said above, it follows that a dentist who wants not only to measure and mix his amalgam-paste in one operation with the aid of an electro-mechanical device, but who also would like to use pre-measured dental cements and synthetic resins, needs two apparatuses. In many dental practices, however, there is not enough space for two apparatuses.

Now a space-saving apparatus has been constructed which is capable both of measuring and mixing mercury and metal-filings for the preparation of amalgam-paste and of shaking the premeasured capsules preferentially containing the components used in the preparation of dental cement and dental synthetic resins.

According to the invention the two conventional devices described above are combined to form a single apparatus which will deliver both amalgam-paste, measured and mixed by the apparatus and mixed filling-materials from premeasured capsules.

A special advantage of this apparatus is that the respective mixing-operations are controlled by one single control-mechanism, such as a time-switch. Moreover, operational safety is significantly increased by the presence of a safety-switch, which interrupts the current to the motor of the mixer if the mixing-vessel of the amalgam measuring- and mixing device has not been or has not firmly been screwed home. This guarantees that no mercury or metal-filings will be flung from the mixing-tube into the working space. An example of a suitable safety-switch is the intermittent control switch 14 of Ahrens U.S. Pat. No. 3,534,943. The entire disclosure of the Ahrens patent is hereby incorporated by reference.

The invention will be understood best in connection with the drawings wherein:

FIG. 1 is a plan view of the apparatus, and

FIG. 2 is a perspective view showing the mixing fork operation.

Referring more specifically to FIG. 1 of the drawing, the mixing apparatus indicated generically by the number 10 comprises a cabinet-type housing 1 which contains on one side containers 12 and 14 for mercury and an alloy (metal filings) respectively. By pressing the button 16, cover 18 is opened on the top of the appliance. The lid 20 of the alloy container 14 is unscrewed and alloy is placed in the container and the lid is replaced tightly. The lid 22 of mercury container 12 is removed and dental mercury poured into the container, e.g., with the aid of a funnel, and the lid is replaced tightly. The mixing ratio of alloy to mercury can be set by a regulating screw 24. Mercury and alloy are supplied to the mixing capsule 26 by operating turning knob 3. The amalgam dispensing and mixing unit just described is also shown in more detail in Röhm U.S. Pat. No. 3,271,011 where, for example, turning knob 20 corresponds to knob 3 in the present drawing. The entire disclosure of Röhm is hereby incorporated by reference.

Care should be taken that sliding switch 6 is set in the correct position for the specific operation desired. Moving sliding switch 6 to the right permits operation of the dispensing and mixing unit. The mixing capsule 26 is attached firmly. The mixing-mechanism starts vibrating by activation of the control-mechanism, here represented as a time switch 24 having a time selection disc 28 thereon which can be set to the recommended setting for the mix employed. The mixing device is activated by pressing starting button 30 of the motor (not shown). Then the dispensing knob 13 is turned clockwise until it stops. Then the knob is returned to the zero or neutral position. Mixing capsule 26 is then vibrated as described in Röhm. After the mixing capsule stops vibrating, it is unscrewed and the amalgam paste is now ready for the filling. The mixing capsule is emptied completely and firmly repositioned on the mixing device.

The apparatus contains on the left side a second and separate mixing device comprising a mixing fork 5. The mixing fork in effect is a clamping or gripping apparatus which grips capsule 50 of pre-measured filling materials which are inserted in the fork. The materials are mixed by vibration controlled by sliding the common control-mechanism, e.g., sliding switch 6 to the left toward the mixing fork symbol.

For the purpose of mixing the apparatus is set into an elliptical motion using the device shown in FIG. 2. The gripping apparatus (mixing fork 5) is fastened to a rod 32. This rod is expanded in about the first quarter into a ball 34 and the ball is supported in two bearings 36 and 38. The rear end of the rod 32 is likewise expanded into a ball 40 which is journalled in a corresponding socket 42. This socket in turn is contained in an eccentric 44 seated on the axle of an electric motor. When the motor is set in motion the mixing fork (with the capsule gripped therein) which is attached to the front end of the rod, goes into an elliptical movement.

To operate the mixing fork, as explained, the sliding switch 6 is moved to the left. The time selection disc 28 is set to the desired mixing time. The capsule (not shown) is placed between the jaws of the mixing fork 5. Then button 30 is pressed to activate the mixing device. After the mixing is completed, the capsule is removed from the fork and the mixed materials removed